United States Patent [19]

Schmid

[11] Patent Number: 4,726,717

[45] Date of Patent: Feb. 23, 1988

[54] DEEP-BORE DRILLING MACHINE

[75] Inventor: Wolfgang Schmid, Dettingen, Fed. Rep. of Germany

[73] Assignee: TBT Tiefbohrtechnik GmbH & Co. KG, Fed. Rep. of Germany

[21] Appl. No.: 947,670

[22] Filed: Dec. 30, 1986

[30] Foreign Application Priority Data

Jan. 15, 1986 [DE] Fed. Rep. of Germany ....... 3600967

[51] Int. Cl.⁴ ............................................. B23B 41/02
[52] U.S. Cl. .................................. 408/118; 408/125; 408/130; 408/705
[58] Field of Search ..................................... 408/20–22, 408/24–26, 705, 97, 36, 118, 124, 125, 129, 130; 29/26 A

[56] References Cited

U.S. PATENT DOCUMENTS 2,995,069  8/1961  Wahlstrom .................... 408/118 X
3,591,301  7/1971  Kaser .............................. 408/56

FOREIGN PATENT DOCUMENTS 2558006  7/1980  Fed. Rep. of Germany .
3522324  1/1987  Fed. Rep. of Germany ...... 408/118

Primary Examiner—Gil Weidenfeld
Assistant Examiner—Steven C. Bishop
Attorney, Agent, or Firm—Michael F. Petock

[57] ABSTRACT

A deep-bore drilling machine consists of a deep-bore drilling unit (1) which is driven by rotation and has a deep drill tool (4, 7). The front end (7) of the deep-bore drilling tool (4) is led into the drill bushing (10) at the beginning of the drilling operation. The drill bushing (10) is thereby contained in a main spindle (22) and is replaceable. Also, the main spindle (22) can also be driven independent of drive (2) of the deep-bore drilling unit (1) by another drive (30).

9 Claims, 4 Drawing Figures

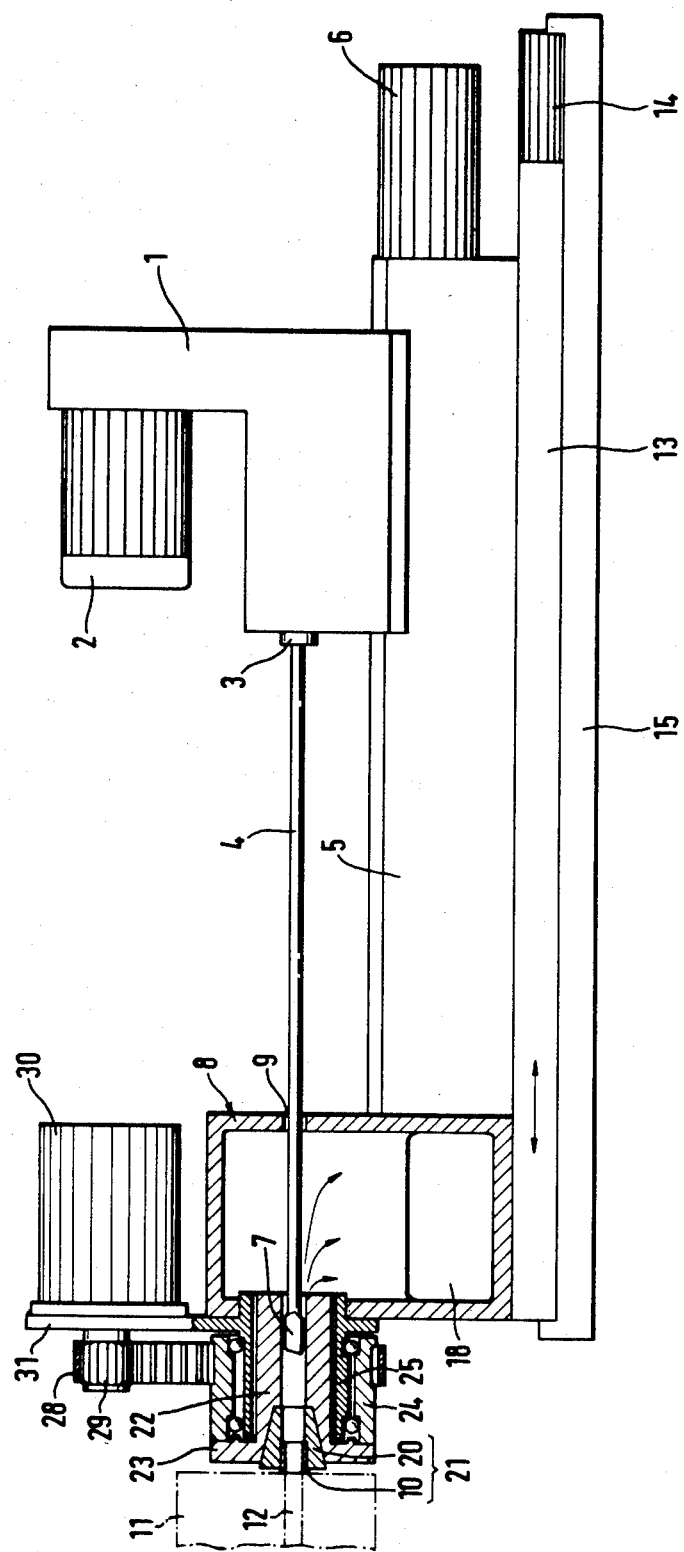

DEEP-BORE DRILLING MACHINE

BACKGROUND OF THE INVENTION

The invention concerns a deep-bore drilling machine with a rotatably driven deep-bore drilling unit and a removable deep-bore (long) drill bit, in which the front end of the deep-bore drill bit or tool is passed at the beginning of the drill path into a drill bushing. Deep-bore drilling machines of that type are known.

SUMMARY OF THE INVENTION

The object of this invention is to develop a deep-bore drilling machine of this type in which not only can deep-bore drilling be conducted —by using a deep-bore drilling tool or bit —but further that additional operations can be performed on the same work piece by inserting other tools. This means that on the same machine and even during the same set-up of the work piece not only can the work piece be drilled, it is possible to perform other regular drilling operations, deburring, threading, milling, etc. for which the additional means needed for this should be assembled as simply as possible and without loss of the precision required in a deep-bore drilling machine.

The installation according to the invention is resolved thereby in that the replaceable drill bushing is mounted in a main spindle and the main spindle is also driven by rotation by another action independent of the action of the deep-bore drill unit. Further the invention concerns other advantageous developments which are indicated in the subclaims.

In short, the deep-bore drilling machine according to the invention is characterized by an additional driveable main spindle in the receptacle (pliers, chuck or the like) of which can be seated in a conventional way the drill bushing or another tool. If the drill bushing of the chucking means combined with the drill bushing is used and the main spindle locked (either itself or by locking of the driving action of its drive), the deep-bore drilling machine performs the deep-bore drilling in the conventional manner. If the deep-bore drilling unit has a tool unit replaced with another tool (drill, counter-sink bit, milling tool, threader, etc.) and the main spindle is driven by still another drive, then procedures using other tools can be performed as well on the same work piece prior to the deep-bore drilling. The advancing of the spiralling operation spiral towards the work piece can be accomplished in 2 different ways. The first way is by use of conventional slide bearings for a deep-bore drilling machine which basically serves to place the drill bushing against the work piece. The second way is to form the main spindle into a spindle sleeve by using the appropriate hydraulic means to achieve the sliding, with the driving unit attached thereto so it can be moved with the spindle.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is an elevation view, partially in cross-section, of an apparatus in accordance with the present invention.

DETAILED DESCRIPTION OF A PREFERRED EMBODIMENT

Figure 1A:
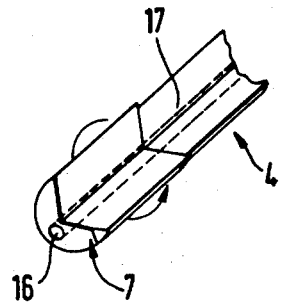
FIG. 1a is a view in perspective of a part of a deep-bore drilling tool in accordance with the present invention.

The deep-bore drilling machine shown in FIG. 1 has a deep-bore drilling unit 1 with a drive motor 2. By means of this drive motor 2, a spindle 3, which rotatably is inserted into the deep-bore drilling unit 1 and is provided with tool-holding means, is driven. The spindle 3 holds a deep-bore drilling tool 4, in this case a simple drill. The deep-bore drilling unit 1 slides on slide bearing 5 in the direction of the drilling. The sliding action of drilling unit 1 is driven by motor 6. The bit or front end of the deep-bore drilling bit tool 4 trivets into the drill bushing carrier or bearing 8, which in the embodiment shown is basically a boxlike housing, which is provided with an entrance for the deep-bore drilling tool 4 by opening 9. The drill head 7 on the front end of the deep-bore drilling tool 4 is introduced by drilling into the drill bushing 10. This bushing 10 is seated against a work piece 11, into which a bore 12 is to be drilled. Drill bushing carrier or bearing 8 is mounted on a sliding bearing 13 which is slidably driven on machine track 15 by means of drive motor 14. The front end of the deep-bore drilling tool 4 is shown in FIG. 1a. There is shown a deep-bore drilling tool of this type (so-called single lip drill) that is provided with an inner channel 16 and having along its perimeter a basically V-shaped groove 17. Cleaning and lubricating fluid may be introduced through the inner channel 16 during the drilling operation. The removal of the cleaning and lubricating fluid along with the chips and shavings is by means of groove 17. The discharge inside the box-shaped housing of the drill bushing carrier or bearing 8 is shown by the arrows. The outflow is through the opening 18 in the drill bushing carrier or bearing 8. So far the deep-bore drilling machine described is known.

The drill bushing 10 is located within a chuck means 20. Thereby the created drill bushing unit 21 is placed so it can rotate into a main spindle 22 which is arranged to be able to rotate in the drill bushing carrier or bearing 8. In this embodiment the rotation arrangement results whereby the main spindle 22 has a flange 23 to which is firmly connected a drive bushing 24. Drive bushing 24 is mounted by means of bearings to be able to rotate on hub 25. Hub 25 is fixedly connected to the drill bushing carrier or bearing 8.

Drive bushing 24 is connected to the drive shaft 29 of a drive motor 30 by means of a gear belt 28. The location of the motor 30 is on a plate 31, which is an integral part of the hub 25 and is firmly seated with it as well on the drill bushing carrier or bearing 8.

In the above described process of deep-bore drilling the drive motor 30 is locked either by internal motor means or otherwise, so that by means the gear belt 28 the main spindle 22 is also locked. Then the deep-bore drilling machine works the conventional way, i.e. by sliding the deep-bore drilling unit 1 in the direction of the work piece 11 —after tapping —the drill head 7 is led into the drill bushing 10. The next step in the processing of the work piece 11 is also performed in a known manner, in which the deep-bore drilling tool 4 extends through the drill bushing 10.

Figure 2:
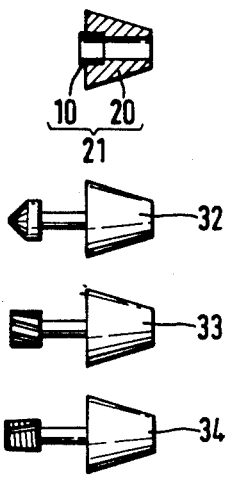
FIG. 2 is a cross-sectional view of a drill bushing unit and an elevation view of three tool units in accordance with the present invention.

The new special feature, however, is that during the following working process on the same work piece the deep-bore drilling unit 21 can be exchanged for deep-bore drilling tool units 32–34 shown in FIG. 2. Then the main spindle 22 will be driven by motor 30, as shown in FIG. 1, e.g. tool unit 32 provided with a countersink bit, tool unit 33 provided with a milling tool (to finish mill the area around bore hole 12) and tool unit 34 provided with a thread cutting die tool.

The advantage in one such device is that in this method other operations can be performed before and after the deep-bore drilling with the same machine and on the same setup of the work piece, when the appropriate tool unit (e.g. 32 to 34) is replaced for the drill bushing unit 21 with the drill bushing 10. During the operation using one of the tool units 32 to 34 the slide bearing 13 is used. It is —in case it is conducted with a fixed arrangement of the table on which the work piece 11 is set up —moved again to the right from the position shown in FIG. 1. Then the replacement is made, i.e. the drill bushing unit 21 is removed and a tool unit 32 to 34 inserted. Then forward thrust to the bore hole 12 is achieved by moving the slide bearing 13 to the left (FIG. 1).

Figure 3:
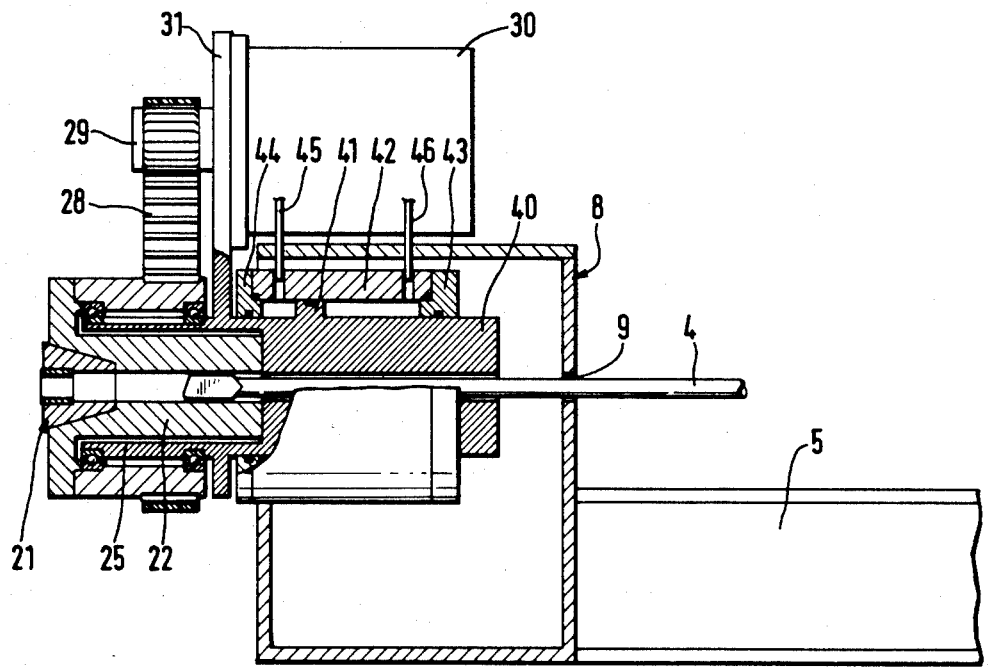
FIG. 3 is an elevation view, partially in cross-section, of an alternate embodiment in accordance with the present invention.

Another embodiment of the invention is shown in FIG. 3. It differs in principle from the embodiment of FIG. 1 in the type and manner of the forward thrust of the main spindle, in which a drill bushing unit 21 is replaceable or one of the tool units 32 to 34 is able to be inserted. In the embodiment of FIG. 3, the main spindle 22 is again seated on a hub 25. This hub 25 is an integral part of the spindle sleeve 40 which is provided with a flange 41. The spindle sleeve 40 with flange 41 is seated in a cylinder 42. The cylinder is provided with cylinder covers 43 and/or 44 on both ends. The sealing of the spindle sleeve 40 with respect to the opening in the cylinder covers and/or the sealing of the flange 41 with respect to the inner surface of the cylinder 42 is as shown in FIG. 3 by suitable seals. By hydraulic connection 45, 46 the spaces to the right and left of the flange 41 between cylinder 42 and spindle sleeve 40 are filled with hydraulic fluid under pressure so that, spindle sleeve 40, and with it the main spindle 22 mounted to be able to rotate correspondingly moves to the left or right. Drive motor 30, drive shaft 29 and gear drive 28 slide along with main spindle 22 since they are located on plate 31, which, being different from the embodiment of FIG. 1, is not stationary but slides with the spindle sleeve 40.

The holder for the drill bushing unit 21 or the tool units 32 to 34 is shown in both modes of execution as cones. The tool holder can of course be any suitable tool holder well known in the art, such as conical chucks, steep angle conical chucks, collets, cylindrical holding units, etc. These are well known to those of ordinary skill in this art.

It should be noted that upon replacing the drill bushing unit 21 with one of the tool units 32–34 no further centering of the shaft of the main spindle 22 towards the bore hole 12 is necessary. Only movement of main spindle 22 backwards towards its shaft by a corresponding backward movement of the slide bearing 13 (in FIG. 1) or backward movement of the spindle sleeve 40 (FIG. 3) is necessary. After replacement of the drill bushing unit with a tool unit, the same movement as before is necessary, without redirecting the main spindle toward the bore hole. The main spindle remains constantly aimed on the one hand at the bore hole and at the shaft of the spindle 3 on the other hand. This produces extremely high precision for various consecutive processes and saves a lot of time as well.

It also follows from the preceding description of the mode of operation that during the processing of the work piece using the tool units 33 etc. the deep-bore drilling tool 4 does not have to be removed or changed. This fact offers a tremendous advantage over the apparatus in which various tools are placed on the same spindle in the same chucking device one after the other.

The present invention may be embodied in other specific forms without departing from the spirit or essential attributes thereof and, accordingly, reference should be made to the appended claims, rather than to the foregoing specification as indicating the scope of the invention.

I claim:

1. A machine tool, comprising:
   drilling unit means provided with a first motor drive means for drilling deep or long bore holes in a work piece, said first motor drive means rotating a long drill bit;
   drill bushing bearing means, said drill bushing bearing having mounted thereon a rotatable main spindle, said main spindle being provided with a second motor drive means, said second motor drive means being independent of said first motor drive means;
   said main spindle being removably fitted at its center of rotation with a drill bushing for receiving said drill bit or another selected tool holder whereby a bore hole may be drilled in a work piece and subsequently selected operations may be performed on the work piece by withdrawing said drill bit and installing selected tools on said main spindle tool holder which remains in alignment with the bore hole in the work piece.

2. A machine tool in accordance with claim 1 wherein said main spindle is mounted on a hub fixed to a housing of the drill bushing bearing means, said main spindle being rotatably driven on said hub by said second motor drive means.

3. A machine tool in accordance with claim 1 wherein said main spindle is rotatably mounted on a hub, said hub being integral with a spindle sleeve mounted within a hydraulic cylinder, said hydraulic cylinder being mounted to a housing of said drill bushing bearing means, said second drive means being integrally mounted to said hub and spindle sleeve, said spindle sleeve being hydraulically positioned to move said main spindle toward and away from the work piece.

4. A machine tool in accordance with claim 1 wherein said main spindle is adapted to be removably fitted with tool holders, in addition to said drill bushing, selected from the group consisting of countersink bits, milling tools, deburring tools and thread cutting die tools.

5. A machine tool in accordance with claim 1 wherein said drilling unit means includes a slide bearing means and a third drive motor means for slidably moving said drill unit on said slide bearing means.

6. A machine tool in accordance with claim 2 wherein said drill bushing bearing means is fixedly mounted to a sliding bearing mounted on a track wherein a fourth motor drive means is provided for slidably moving said sliding bearing on said track thereby moving said drill bushing bearing means toward or away from said work piece.

7. A deep-bore drilling machine comprising:
 a first machine spindle (3) adapted for receiving a deep drilling tool (4);
 first driving means (2) for driving said first machine spindle (3);
 a drill bushing carrier (8);
 a second spindle (22) rotatably provided on said drill bushing carrier (8) adapted for selectively receiving and driving one of a plurality of tool units (32,33,34) or a bushing unit (21) for said deep drilling tool (4);
 second driving means (30) for driving said second spindle (22) independently of said first machine spindle (3); and means to selectively lock said second driving means when said bushing unit (21) is received in said second spindle (22).

8. A deep-bore drilling machine according to claim 7, wherein said second spindle (22) is arranged on a hub (25), said hub being fixedly connected to said drill bushing carrier (8), and further including means (13,14) for providing a feeding movement of said drill bushing carrier (8) to move said second spindle (22) in a direction towards a workpiece (11).

9. A deep-bore drilling machine according to claim 7, wherein said second spindle (22) is arranged on a hub (25), said hub (25) being provided on a sleeve (40) which is axially displaceable to provide a feeding movement for said second spindle (22) toward of a workpiece (11), and wherein said second driving means (30) is provided on said sleeve (40) to move in axial direction therewith, said sleeve (40) being fluidically axially displaceable within a cylinder (42).

* * * * *